United States Patent [19]
Eckert

[11] 4,384,486
[45] May 24, 1983

[54] FILL INDICATOR FOR FIRE EXTINGUISHING SYSTEMS
[75] Inventor: Robert D. Eckert, Wonder Lake, Ill.
[73] Assignee: General Fire Extinguisher Corporation, Northbrook, Ill.
[21] Appl. No.: 241,740
[22] Filed: Mar. 9, 1981
[51] Int. Cl.³ .............................................. G01F 23/12
[52] U.S. Cl. ...................................... 73/314; 73/319; 73/321
[58] Field of Search ................. 73/319, 314, 321, 309

[56] References Cited
U.S. PATENT DOCUMENTS
3,283,578  11/1966  Moore ................................... 73/321

Primary Examiner—James J. Gill
Attorney, Agent, or Firm—Wood, Dalton, Phillips, Mason & Rowe

[57] ABSTRACT

An improved indicator for fill content of a fire extinguishing system including a pressure vessel having an outlet through which the fire extinguishing material may flow. The indicator includes a non-magnetic, closed housing, mounted on the vessel and having one end within the vessel and the other end exteriorly of the vessel. At least one of the vessel and the housing are sealed to the atmosphere and a visual access opening is provided on the exterior end of the housing to allow one to look into the interior of the housing. A tape is mounted within the housing for movement in a path past the visual access opening and includes indicia along its length. A first magnet is carried by the tape within the housing while a second magnet is mounted for movement on the exterior of the housing and a float is provided to move the second magnet proportional to the level of fire extinguishing material therein thereby causing, through magnetic interaction, the first magnet to move the tape so that its indicia may be observed as an indication of the level of fill within the vessel.

1 Claim, 1 Drawing Figure

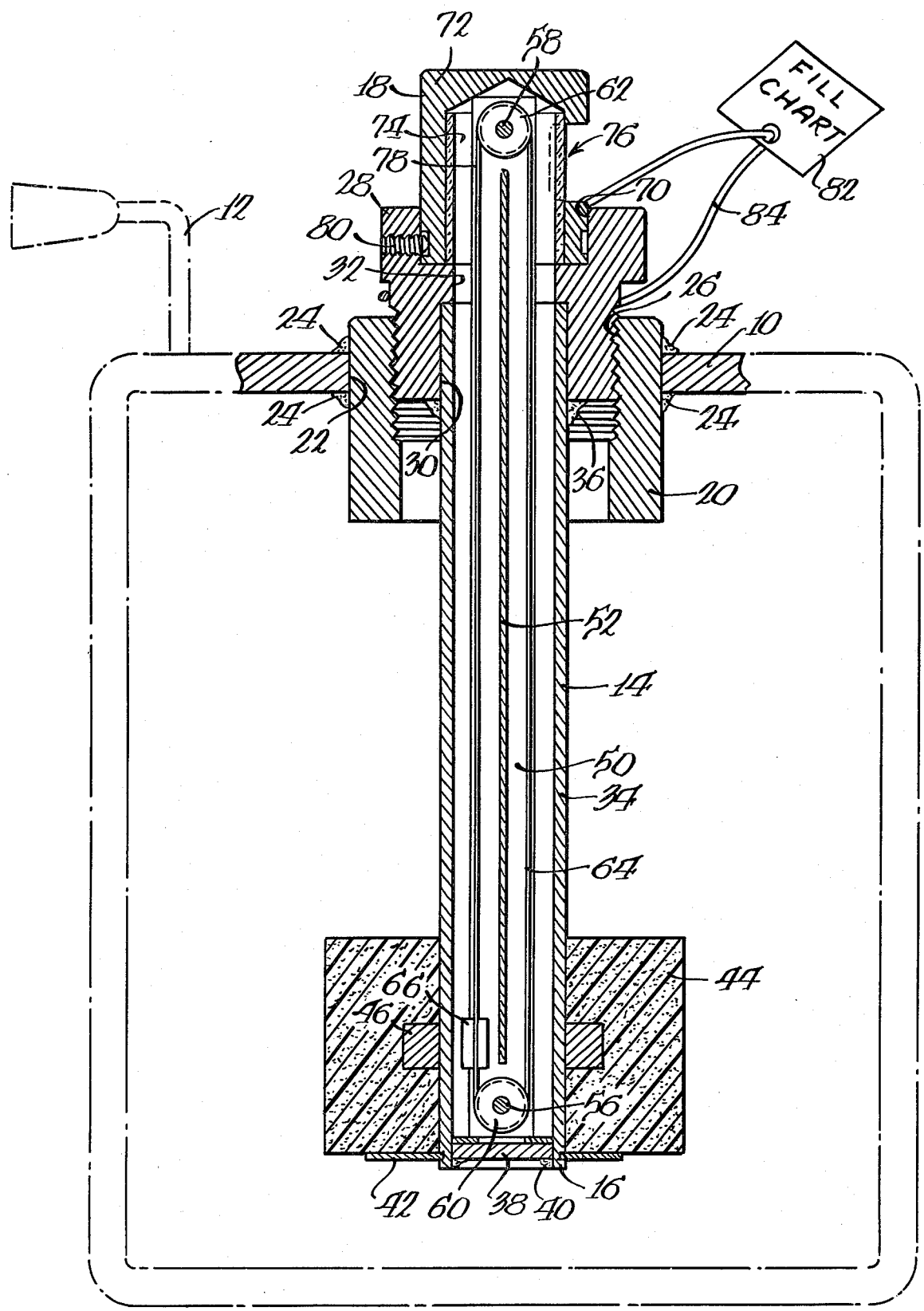

FILL INDICATOR FOR FIRE EXTINGUISHING SYSTEMS

FIELD OF THE INVENTION

This invention relates to fire extinguishing systems, and more particularly, to an improved indicator for indicating the fill of fire extinguishing material in a fire extinguishing system such that the fill may be determined with excellent accuracy.

BACKGROUND OF THE INVENTION

The loss of fire extinguishing and/or pressurizing material in fire extinguishers of the type wherein the contents are stored under pressure and/or exposed to pressure for delivery purposes has long been a significant concern. For once there is undetected loss, and a fire occurs, the ability to control the fire with the fire extinguishing system is considerably undermined in relation to the lost quantity of fire extinguishing material or the inability to pressurize the fire extinguishing material sufficiently to deliver the entire contents of the system. Consequently, the fire protection industry and/or governmental agencies have long required that extinguishers of this type be checked every six months to determine whether a loss has occurred.

Most frequently, the check is accomplished simply by weighing the fire extinguishing vessel and observing any difference between its fully charged weight and the weight at time of weighing. This method of inspection is quite satisfactory where relatively small vessels are employed in the systems. However, in recent years, there has been a trend to increase the size of the vessels containing the extinguishing agent and as the size of the vessels has increased, the impracticality of weighing the same has become apparent.

Consequently, in the case of fire extinguishers employing liquified gaseous agents such as carbon dioxide, Halon 1301, Halon 1211, and the like, various methods other than weighing have been employed in an attempt to determine the liquid level inside the vessel. For example, various approaches have been tried utilizing sonar, radioactive counters, and heat sensitive liquid crystal tapes to find the liquid level which could then be compared to the original fill level so that the losses, if any, could be established. Such procedures have not been widely accepted due to the fact that such extinguishing agents undergo significant liquid volume changes with changes in ambient temperature. Thus, the only accurate comparison that could be made would be if the measurement were taken at a temperature equal to the temperature at which the vessel was originally filled. As such temperature coincidence rarely exists, the various methods based on such an approach have not been entirely successful although they could provide a rough indication of the need for recharging of an extinguishing system when the loss is fairly substantial.

As vessel size increased, the problem of extinguishing agent loss became of even greater importance since extremely large vessels require a great deal of time and effort to remove them from service for the accurate weight inspection approach. As a result, it was proposed to dispose a tube, accessible from the exterior of the vessel, and sealed thereto, into the vessel to be immersed in the liquid therein. From the access opening, a dip stick of non-magnetic material bearing a magnet on one end and calibrated with indicia was then inserted into the tube. Within the vessel, the tube mounted a magnet carried by a float with the result that when the magnet on the dip stick came within close proximity to the magnet on the float, the resultant attraction would prevent the dip stick from falling further into the tube. The incremental indicia on the dip stick could then be read to provide an indication of the liquid level within the vessel. A calibrated curve in the form of a graph was attached to the exterior of the vessel for showing the volume variations that might occur due to changes in ambient temperature.

This approach, while an improvement over prior art practices, is incomplete. The vessels may not always be filled to the same fill density with extinguishing agent and as a consequence, the calibration shown by the graph, while good for one fill density for one type of first extinguishing agent and for one particular level of super-pressurization, if any, would not be accurate if the fill density, the type of extinguishing agent, or the level of super-pressurization were changed during subsequent recharging. Moreover, the very manual nature of the measuring procedure makes it subject to inaccuracies other than those of mere observation due to the human involvement required.

SUMMARY OF THE INVENTION

It is the principal object of the invention to provide and new and improved fill indicator for fire extinguishing systems. More specifically, it is an object of the invention to provide a fill indicating system for a fire extinguisher that requires only observation without human manipulation and which can provide accurate fill information irrespective of the many variables involved.

An exemplary embodiment of the invention achieves the foregoing object in a fire extinguishing system including a pressure vessel having an outlet through which a fire extinguishing agent may flow. A non-magnetic closed housing is mounted on the vessel and has one end within the vessel and another end exterior of the vessel. Means seal at least one of the vessel and the housing to the atmosphere surrounding the vessel and means are provided on the end of the housing exterior of the vessel to allow visual access to the interior of the housing. A tape is mounted for movement within the housing in a path extending past the visual access providing means and includes indicia along its length. A first magnet is carried by the tape within the housing while a second magnet is mounted for movement on the exterior of the housing. A float is disposed within the vessel exterior of the housing and is connected to the second magnet to move the same along the housing proportional to the level of fire extinguishing material therein.

As a consequence, the tape will likewise be moved and the indicia thereon may be observed as an indication of liquid level through the visual access providing means.

According to a preferred embodiment of the invention, the tape is a continuous loop which is mounted for movement by two spaced rollers within the housing.

In a highly preferred embodiment of the invention, the rollers are mounted on a frame separate from but located within the housing and the end of the housing exterior of the vessel including the visual access providing means comprises a rotatable cap. The frame is secured to the cap for rotation therewith to allow visual access to the tape from any of a plurality of positions about the vessel dependent upon the rotative position of the cap.

The invention further contemplates the provision of a fill determining data chart removably attached to the vessel. The data chart includes data correlating the indicia on the tape with a variety of expected fire extinguishing material levels at varying temperatures for the specific type of fire extinguishing material in the vessel, the fill density thereof, and super-pressurization of the vessel, if any.

Other objects and advantages of the invention will become apparent from the following specification taken in connection with the accompanying drawing.

DESCRIPTION OF THE DRAWING

The FIGURE is a sectional view of a fire extinguishing system made according to the invention with certain components shown somewhat schematically.

DESCRIPTION OF THE PREFERRED EMBODIMENT

An exemplary embodiment of a fire extinguishing system equipped with an indicator made according to the invention is illustrated in the FIGURE and is seen to include a pressure vessel 10 for containing a liquified gaseous fire extinguishing agent under pressure. The vessel 10 is provided with an outlet, schematically shown at 12, through which the agent may flow to be directed at a fire. Suitable controls (not shown) for the outlet 12 are, of course, provided.

A closed, non-magnetic housing 14 is mounted on the vessel 10 such that an end 16 thereof is within the vessel 10 to be immersed in the extinguishing agent contained therein while another end 18 of the housing 14 is located exteriorly of the vessel 10. The foregoing is accomplished by means of a spud 20 disposed in an opening 22 in the vessel and located therein as by welds 24 which serve to seal the interior of the vessel 10 from the surrounding atmosphere. The spud 20 is interiorly threaded as at 26 to threadably and sealingly receive a threaded fitting 28 forming part of the housing 14. The fitting 28 includes a lower bore 30 terminating in a shoulder 32. A circular tube 34 of non-magnetic material is received within the bore 30 and abutted against the shoulder 32. Suitable sealing means 36 at the interface of the tube 34 and the bore 30 are provided. Typically, such sealing means could comprise a soldered joint, brazed joint, welded joint or the like.

The end of the tube 34 within the vessel 10 is plugged by a plug 38 and the interface of the plug 38 and the tube 34 are sealed at 40 by means similar or identical to the seals 36.

A disk-like retainer 42 is fixed to the lower end of the tube 34 by any suitable means to extend radially outwardly of the exterior thereof. Slidably mounted on the tube 34 is a float 44 formed of any suitable material that will float on the surface of the fire extinguishing agent contained in the vessel 10. The float 44 carries an annular magnet 46 which is in substantial abutment with the exterior of the tube 34 and thus will move along the latter with the float 44 in response to level fluctuations within the vessel 10.

Within the tube 34 there is located a frame formed of two elongated strips 50 (only one of which is shown) interconnected by a web 52 of lesser length than either of the strips. At opposite ends of the strips 50, and extending between the two strips 50, there is a pivot pin 56 and 58 respectively. The pivot pins 56 and 58 respectively journal rollers 60 and 62 and a continuous loop of a flexible tape-like material 64 is trained about the rollers 58 and 60. The tape 64 is marked with indicia (not shown) and incremented. For example, the tape 64 may be provided with numbered hash marks delineating any suitable unit of length.

At an appropriate location on the tape 64, there is mounted a magnet 66. The arrangement is such that when the float 44 is at its lowermost position on the tube 34, the two magnets 46 and 66 will be in the relative position shown. It will thus be appreciated that should the float 44 rise carrying the magnet 46 upwardly on the tube 34, the magnet 66, due to magnetic attraction to the magnet 46, will follow the same thereby indexing the tape 64 through its path of movement until further upward movement of the float 44 is prevented. Downward movement of the float 44 from a position elevated above that illustrated in the FIGURE will cause reverse movement of the tape 64. The fitting 28, at its upper end, is provided with a bore 70 which terminates at the shoulder 32. Received within the bore 70 is a generally cylindrical cap 72 having a hollow interior 74. One side of the cap 72 is cut away as at 76 and a hollow cylinder of transparent material, such as glass or a lens structure 78 is disposed within the hollow interior 74 of the cap 72 so as to close the cut-away opening 76. Thus, the cut-away opening 76 together with the lens 78 provide a means for achieving visual access to the interior of the housing 14.

It will be observed from the FIGURE that the frame comprised of the strips 50 and 52 extends upwardly into the hollow interior 74 of the cap 72 and preferrably is secured to the cap 72 such that the flat surface of the tap 64 faces the cut-away 76 in the cap 72. Thus, the indicia on the tape 64 may be read through the lens 78 at the cut-away 76.

The cap 72 may be rotated within the bore 70 and by reason of the attachment of the frame elements 50 and 52 to the cap 72, the tape structure 64 will rotate with the cap to insure that the flat part of the tape 64 bearing the indicia remains aligned with the cut-away 76 for visual access. Thus, by rotating the cap 72, visual access to the indicia on the tape 64 may be obtained from any of a plurality of positions around the vessel 10 dependent upon the rotative position of the cap 72. Once the desired viewing position is established a set screw 80 in the fitting 28 may be brought to bear against the cap 72 to prevent its removal from the bore 70 and any further rotation thereof.

The invention further contemplates the provision of a fill determining data chart 82 that may be removably attached to the vessel 10 by any suitable means as, for example, a lanyard 84 or the like. A typical example of the data contained on the fill chart 82 is shown in the following table.

HALON-1301 WITH NITROGEN SUPERPRESSURE
PRESSURE-TEMPERATURE CHARACTERISTICS

HALON-1301 CHARGE = 350 LB.(S)
CONTAINER VOLUME = 5 CU. FT.
FILL DENSITY = 70 LBS./CU. FT.
REFERENCE CONDITIONS: 360 PSIG AT 70 DEGREES °F.
BUBBLE POINT = 132.4 DEG. °F. 622.3 PSIG
NITROGEN CHARGE = 3.469561 LB. OR (55.5130 OZ.)

| TEMP. °F. | LEVEL READING | VOL. PCT LIQ FILL | LBS LIQUID HALON-1301 | NITROGEN XN2 | NITROGEN WN2 | SPECIFIC GRAVITY | LBS. NITROGEN LIQUID | LBS. NITROGEN VAPOR | TOTAL PSIG |
|---|---|---|---|---|---|---|---|---|---|
| −20 | 71.0 | 61.0853 | 346.8493 | .02851 | .00548 | 1.8328 | 1.9125 | 1.5571 | 165.9 |
| −15 | 71.6 | 61.5431 | 346.5797 | .02876 | .00553 | 1.8178 | 1.9284 | 1.5411 | 172.6 |
| −10 | 72.1 | 62.0134 | 346.2958 | .02902 | .00558 | 1.8027 | 1.9446 | 1.5250 | 179.7 |
| −5 | 72.7 | 62.4971 | 345.9977 | .02928 | .00564 | 1.7873 | 1.9610 | 1.5085 | 187.2 |
| 0 | 73.3 | 62.9952 | 345.6854 | .02955 | .00569 | 1.7716 | 1.9779 | 1.4917 | 195.1 |
| 5 | 73.9 | 63.5088 | 345.3590 | .02983 | .00574 | 1.7558 | 1.9952 | 1.4743 | 203.5 |
| 10 | 74.5 | 64.0393 | 345.0189 | .03012 | .00580 | 1.7396 | 2.0132 | 1.4564 | 212.3 |
| 15 | 75.1 | 64.5881 | 344.6655 | .03042 | .00586 | 1.7231 | 2.0318 | 1.4378 | 221.6 |
| 20 | 75.8 | 65.1569 | 344.2992 | .03073 | .00592 | 1.7064 | 2.0513 | 1.4183 | 231.4 |
| 25 | 76.5 | 65.7475 | 343.9210 | .03106 | .00599 | 1.6893 | 2.0717 | 1.3979 | 241.7 |
| 30 | 77.2 | 66.3620 | 343.5318 | .03141 | .00606 | 1.6719 | 2.0931 | 1.3764 | 252.6 |
| 35 | 77.9 | 67.0028 | 343.1331 | .03177 | .00613 | 1.6541 | 2.1158 | 1.3538 | 264.0 |
| 40 | 78.7 | 67.6729 | 342.7264 | .03216 | .00620 | 1.6459 | 2.1398 | 1.3298 | 275.9 |
| 45 | 79.5 | 68.3754 | 342.3140 | .03257 | .00629 | 1.6173 | 2.1653 | 1.3042 | 288.4 |
| 50 | 80.4 | 69.1141 | 341.8986 | .03300 | .00637 | 1.5982 | 2.1926 | 1.2770 | 301.5 |
| 55 | 81.3 | 69.8935 | 341.4837 | .03346 | .00646 | 1.5786 | 2.2217 | 1.2478 | 315.2 |
| 60 | 82.2 | 70.7188 | 341.0736 | .03396 | .00656 | 1.5585 | 2.2531 | 1.2165 | 329.5 |
| 65 | 83.3 | 71.5963 | 340.6740 | .03449 | .00667 | 1.5377 | 2.2868 | 1.1827 | 344.4 |
| 70 | 84.4 | 72.5336 | 340.2920 | .03506 | .00678 | 1.5163 | 2.3234 | 1.1462 | 360.0 |
| 75 | 85.5 | 73.5398 | 339.9366 | .03567 | .00690 | 1.4942 | 2.3631 | 1.1065 | 376.3 |
| 80 | 86.8 | 74.6264 | 339.6196 | .03634 | .00704 | 1.4713 | 2.4064 | 1.0631 | 393.2 |
| 85 | 88.2 | 75.8073 | 339.3563 | .03706 | .00718 | 1.4474 | 2.4540 | 1.0156 | 410.9 |
| 90 | 89.7 | 77.1005 | 339.1671 | .03784 | .00734 | 1.4226 | 2.5065 | .9630 | 429.3 |
| 95 | 91.3 | 78.5291 | 339.0790 | .03870 | .00751 | 1.3966 | 2.5649 | .9046 | 448.4 |
| 100 | 93.2 | 80.1233 | 339.1287 | .03964 | .00770 | 1.3693 | 2.6305 | .8391 | 468.4 |
| 105 | 95.3 | 81.9240 | 339.3675 | .04069 | .00791 | 1.3404 | 2.7049 | .7647 | 489.1 |
| 110 | 97.7 | 83.9877 | 339.8677 | .04186 | .00814 | 1.3097 | 2.7904 | .6792 | 510.8 |
| 115 | 100.5 | 86.3951 | 340.7352 | .04319 | .00841 | 1.2768 | 2.8906 | .5790 | 533.4 |
| 120 | 103.8 | 89.2670 | 342.1306 | .04473 | .00872 | 1.2412 | 3.0106 | .4590 | 557.1 |
| 125 | 107.9 | 92.7932 | 344.3085 | .04655 | .00909 | 1.2021 | 3.1592 | .3104 | 582.1 |
| 130 | 113.2 | 97.2950 | 347.6985 | .04879 | .00955 | 1.1583 | 3.3517 | .1179 | 608.6 |

As can be seen from the foregoing table, the same is made up specifically for a particular type of extinguishing agent, namely, Halon 1301 with nitrogen superpressure to a fill density of 70 pounds per cubic foot. The table illustrates level readings correlating the indicia on the tape 64 with various ambient temperatures as well as other data of interest and typically can be computer generated using known data at the time the vessel is charged or recharged for the specific variables involved. For example, if a different agent were utilized, a different set of data would be provided. Similarly, if the fill density were changed, still a different set of data would be utilized. In a like vein, for a different super-pressurizing agent or a different super-pressurizing charge, still other data would be utilized. Thus, at the time of charging, the specific fill chart required to accurately assess the level indications provided by the indicator in connection with the determination of loss of the agent can be attached to the vessel for ready reference. Should, at a subsequent time of recharging, one or more of the variables be changed, the previously attached fill chart may be removed and a new one appropriate to the new fill parameters may be attached.

It will be appreciated from those skilled in the art that an indicating system made according to the invention minimizes the possibility for human error in that all that need be done is made an accurate observation of the indicia on the tape 64 which requires no manual manipulation of components on the part of the observer. It will also be appreciated that the indicator unit is substantially sealed so that its components cannot be affected by foreign objects or the like. Finally, it will be appreciated that the use of a fill chart such as disclosed herein insures that data appropriate to the many variables that may exist is available to correlate readings obtained from the indicator with underfill or proper charge conditions.

I claim:
1. A fire extinguishing system including:
a pressure vessel having an outlet through which a fire extinguishing material may flow;
a non-magnetic, closed housing mounted on said vessel and having one end within said vessel and another end exterior of said vessel;
means sealing at least one of said vessel and said housing to the atmosphere surrounding said vessel;
means on said another end providing for visual access to the interior of said housing;
a tape mounted for movement within said housing in a path extending past said visual access providing means, said tape including indicia along its length;
a first magnet carried by said tape within said housing;
a second magnet mounted for movement on the exterior of said having:
a float within said vessel exterior of said housing and connected to said second magnet to move the same along said housing proportional to the level of fire extinguishing material therein, said tape being a continuous loop mounted for movement by two spaced rollers within said housing; said rollers being mounted on a frame separate from, but located within said housing;

said housing another end comprising a rotatable cap containing said visual access providing means, said frame being secured to said cap for rotation therewith to thereby allow visual access to said tape from any of a plurality of positions about said vessel dependent upon the relative position of said cap.

* * * * *